US012398874B1

(12) United States Patent
Li et al.

(10) Patent No.: US 12,398,874 B1
(45) Date of Patent: Aug. 26, 2025

(54) LED LIGHTING EQUIPMENT WITH HEAT DISSIPATION MODULE

(71) Applicant: Shanghai Flextail Technology Co., Ltd, Shanghai (CN)

(72) Inventors: Xiaonan Li, Shanghai (CN); Guoliang Hu, Shanghai (CN); Chonghua Fei, Shanghai (CN); Cong Chen, Shanghai (CN)

(73) Assignee: Shanghai Flextail Technology Co., Ltd, Shanghai (CN)

( * ) Notice: Subject to any disclaimer, the term of this patent is extended or adjusted under 35 U.S.C. 154(b) by 0 days.

(21) Appl. No.: 18/882,085

(22) Filed: Sep. 11, 2024

(30) Foreign Application Priority Data

Apr. 10, 2024 (CN) ......................... 202420733544.8

(51) Int. Cl.
*F21V 29/67* (2015.01)
*F21V 29/503* (2015.01)
*F21V 29/507* (2015.01)
*F21Y 115/10* (2016.01)

(52) U.S. Cl.
CPC .......... *F21V 29/677* (2015.01); *F21V 29/503* (2015.01); *F21V 29/507* (2015.01); *F21Y 2115/10* (2016.08)

(58) Field of Classification Search
CPC ........ F21V 29/673; F21V 26/67; F21V 29/60; F21V 29/507; F21V 29/503; F21V 15/01
See application file for complete search history.

(56) References Cited

U.S. PATENT DOCUMENTS 7,144,135 B2 * 12/2006 Martin .................... F21S 6/003 362/345
7,144,140 B2 * 12/2006 Sun ....................... F21V 29/677 362/373
7,524,089 B2 * 4/2009 Park .......................... F21V 3/02 362/345
7,837,363 B2 * 11/2010 Liu ....................... F21V 29/677 362/373
8,123,381 B1 * 2/2012 Wray ........................ F21K 9/23 362/373
8,430,528 B2 * 4/2013 Yu ........................... F21K 9/232 362/249.02

(Continued)

FOREIGN PATENT DOCUMENTS

CN 101216162 A 7/2008
CN 105009260 A 10/2015

(Continued)

*Primary Examiner* — Ismael Negron
(74) *Attorney, Agent, or Firm* — Woodard, Emhardt, Henry, Reeves & Wagner, LLP

(57) ABSTRACT

The LED lighting equipment includes a heat dissipation module having a main housing with a medium outlet and a medium inlet, a fan disposed in the main housing, and a lighting assembly. The main housing surrounds the lighting assembly to define a fluid channel between the medium inlet and medium outlet, such that a cooling medium is driven by the fan to flow along the fluid channel to carry away heat from the lighting assembly. The lighting assembly might include a plurality of lamp beads arranged on a light board disposed on a support; the main housing might include a first housing containing the fan and the medium inlet, and a second housing containing the lighting assembly and the medium outlet.

14 Claims, 5 Drawing Sheets

(56) References Cited

U.S. PATENT DOCUMENTS

| | | | | | |
|---|---|---|---|---|---|
| 8,459,846 | B2 | 6/2013 | Tsao | | |
| 8,541,932 | B2 * | 9/2013 | Horng | F21V 29/74 | 313/46 |
| 8,994,273 | B2 * | 3/2015 | Kornitz | F21V 29/763 | 362/373 |
| 9,188,322 | B2 | 11/2015 | Lan | | |
| 9,429,295 | B2 * | 8/2016 | Ahn | F21K 9/233 | |
| 9,534,848 | B2 | 1/2017 | Wang et al. | | |
| 10,184,489 | B2 | 1/2019 | Avedon | | |
| 2010/0165632 | A1 * | 7/2010 | Liang | F21K 9/232 | 362/373 |
| 2011/0037368 | A1 * | 2/2011 | Huang | F21V 29/507 | 313/46 |
| 2015/0138780 | A1 * | 5/2015 | Yoshizawa | F21V 29/677 | 362/373 |
| 2016/0186981 | A1 * | 6/2016 | Chen | F21V 23/006 | 362/373 |

FOREIGN PATENT DOCUMENTS

| | | | |
|---|---|---|---|
| CN | 106838841 | A | 6/2017 |
| CN | 206637321 | U | 11/2017 |
| CN | 208156532 | U | 11/2018 |
| CN | 112682757 | A | 4/2021 |
| CN | 220036995 | U | 11/2023 |
| EP | 2664845 | A1 | 11/2013 |

* cited by examiner

LED LIGHTING EQUIPMENT WITH HEAT DISSIPATION MODULE

FIELD OF THE DISCLOSURE

The present application relates to a technical field of heat dissipation for lighting equipment, and more specifically to a heat dissipation module and LED lighting equipment.

BACKGROUND

Currently, lighting products often encounter the demand of effective heat dissipation during use. Lighting assemblies generate heat during a discharge process, necessitating efficient heat dissipation measures to prevent adverse effects on the lighting assembly and the overall device. Heat dissipation for the lighting assembly is crucial as it directly affects the performance, lifespan, and safety of the entire device. Therefore, improvements in the current technology are needed.

SUMMARY OF THE INVENTION

To address the above technical problems, the purpose of this application is to provide a heat dissipation module and LED lighting equipment capable of promptly cooling the lighting assembly to prevent the equipment from being adversely affected by continuous temperature rise during operation.

To achieve the above purpose, this application provides a heat dissipation module, adapted to be configured at a lighting assembly, comprising:

a main housing, covering a periphery of the lighting assembly, forming a fluid channel between the lighting assembly and the main housing, wherein the main housing is provided with a medium inlet and a medium outlet that are both fluidly connected to the fluid channel, wherein the medium inlet is utilized for inputting a cooling medium, and the medium outlet is utilized for outputting the cooling medium;

fan blades, rotatably connected to the main housing, positioned relatively close to the medium inlet, and connected to a drive component for rotation, wherein the fan blades are utilized to disperse the cooling medium, and to facilitate a flow of the dispersed cooling medium through the fluid channel and over a surface of the lighting assembly for heat dissipation.

It is worth mentioning that the main shell disposed outside the light assembly forms a heat dissipation channel, that is, the above-mentioned fluid channel, and the fan blades improve the uniformity of the flow of the cooling medium in the fluid channel, improving the heat dissipation effect of the light assembly.

In some embodiments, the main housing comprises a first housing and a second housing wherein the first housing and the second housing are matched and connected together; and the medium inlet is provided at the first housing, and the medium outlet is provided at the second housing; and the fan blades are provided inside the first housing, and the lighting assembly is positioned on a side of the first housing close to the second housing, with the second housing covering the periphery of the lighting assembly to form the fluid channel.

In some embodiments, the first housing comprises a top housing and a middle housing, wherein the middle housing is connected to the second housing, and the middle housing is matched and connected to both the lighting assembly and the fan blades, with the lighting assembly and the fan blades positioned on opposite sides of the middle housing; and the top housing is connected to the middle housing on a side of the fan blades, and a space is provided between the top housing and the middle housing to allow a motion of the fan blades.

In some embodiments, several flow channels are provided at a periphery of the middle housing circumferentially distributed and connected to the fluid channel; and the periphery of the middle housing is divided into a first ring and a second ring by the flow channels in a width direction, and the first ring docks with an edge of the second housing, and the second ring docks with an edge of the lighting assembly.

Here, the combined use of the flow channels and the fan blades makes the cooling medium more uniformly discharged. During the rotation of the fan blades, the cooling medium flows to the fluid channel through several flow channels under the driving force of the fan blades. The cooling medium then flows by the lighting assembly, so that the cooling medium and the lighting assembly exchange heat to achieve a cooling effect.

In some embodiments, the second ring and the edge of the lighting assembly is provided with corresponding concave-convex structures for guiding an alignment between the middle housing and the lighting assembly to prevent misalignment or rotational deviation; and each flow channel extends parallel to an axial direction of the middle housing or at a preset angle to the axial direction of the middle housing.

In some embodiments, the middle housing is provided with a through-hole, wherein the through-hole extends in a direction away from the fan blades to form an annular flange, and at least part of the drive component passes through the annular flange, and a drive shaft of the drive component is connected to the fan blades along an extension direction of the annular flange.

In some embodiments, the lighting assembly comprises a support, a lighting board, and a first cover, wherein the support is connected to the first housing; and the lighting board is configured at the support, and the first cover covers a periphery of the lighting board and is connected to the first housing.

In some embodiments, the support is hollow inside, with the lighting board positioned and fixed inside; and the first cover covers both the support and the lighting board, and both the support and the first cover feature light-transmitting areas, and the lighting board is provided with lamp beads, wherein light emitted by the lamp beads is facilitated to pass through the light-transmitting areas.

In some embodiments, the medium outlet on the second housing is configured as a reducing nozzle, with a diameter of the reducing nozzle decreasing monotonically in an output direction of the cooling medium, and a contour of the first cover near the medium outlet is adapted to a contour of the reducing nozzle.

In another aspect of the present application, an LED lighting equipment is provided, comprising a heat dissipation module according to any one of the embodiments above.

Compared to prior art, the provided heat dissipation module and LED lighting equipment have at least one of the following beneficial effects:

1. In the heat dissipation module provided by the present application, the fluid channel formed between the main housing and the lighting assembly enables a flow of cooling medium, and combined with the continuous rotation of the fan blades, improves cooling efficiency and prevents damage to the lighting assembly due to overheating.

2. According to the heat dissipation module provided by the present application, the concave-convex structure between the lighting assembly and the housing ensures accurate alignment and prevents rotational deviation, improving overall reliability and practicality.

BRIEF DESCRIPTION OF THE DRAWINGS

To further clarify the characteristics, technical features, advantages, and implementation methods of the present application, the preferred embodiments will be described in conjunction with the accompanying drawings in a clear and understandable manner.

EXPLANATION OF REFERENCE NUMBERS

Figure 1:
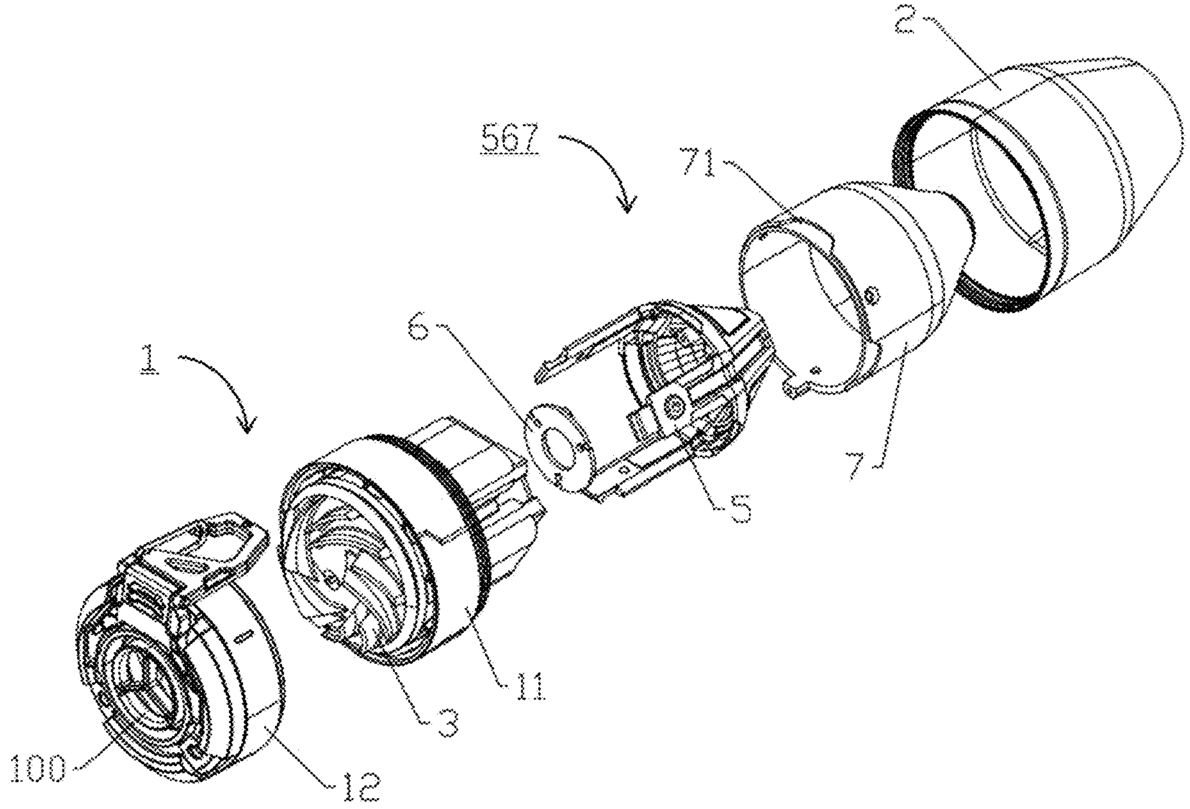
FIG. 1 is an exploded view of one embodiment of the present application.

Medium inlet 100, First housing 1, Middle housing 11, Flow channel 110, First ring 1101, Second ring 1102, Annular flange 111, Top housing 12, Protruding edge 13, Flow guide plate 14, Central axis 15, Second housing 2, Medium outlet 200, Fluid channel 300, Fan blade 3, Drive component 4, Lighting assembly 567, Support 5, Lighting board 6, First cover 7, Recess 71.

DESCRIPTION OF THE ILLUSTRATED EMBODIMENTS

To make the technical solutions of the embodiments or the prior art clearer, the specific embodiments of the present application will be described in conjunction with the accompanying drawings. It should be understood that the drawings in the following description are merely some embodiments of the present application. Those skilled in the art can obtain other drawings and other embodiments without creative efforts based on these drawings.

For simplicity, only parts relevant to the application are schematically shown in the drawings, and they do not represent the actual structure of a product. Additionally, to keep the drawings simple and easy to understand, parts with similar structures or functions in some drawings are schematically illustrated with only one part or one label.

The term "and/or" used in the claims and the specification should be understood as including any and all possible combinations of one or more of the associated listed items.

In this document, unless otherwise specified or limited, the terms "install," "connect," and "link" should be interpreted broadly. For example, they may refer to fixed connections, removable connections, or integral connections; mechanical connections or electrical connections; direct connections or indirect connections through intermediaries; internal communications between two elements. The specific meanings of these terms in the present application should be understood in specific contexts by those skilled in the art.

In the description of the present application, it should be understood that the terms "center," "longitudinal," "transverse," "length," "width," "thickness," "upper," "lower," "front," "rear," "vertical," "horizontal," "top," "bottom," "inner," "outer," "clockwise," "counterclockwise," "axial," "radial," "circumferential" and similar terms indicating orientation or position are based on the positions or orientations shown in the drawings. They are used only for the convenience of describing the present application and simplifying the description, not to indicate or imply that the referred device or element must have a specific orientation, be constructed in a specific orientation, and operate in a specific orientation, and therefore should not be construed as limiting the present application.

Additionally, terms like "first," "second," etc., are used for descriptive purposes only and should not be interpreted as indicating or implying relative importance.

Figure 2:
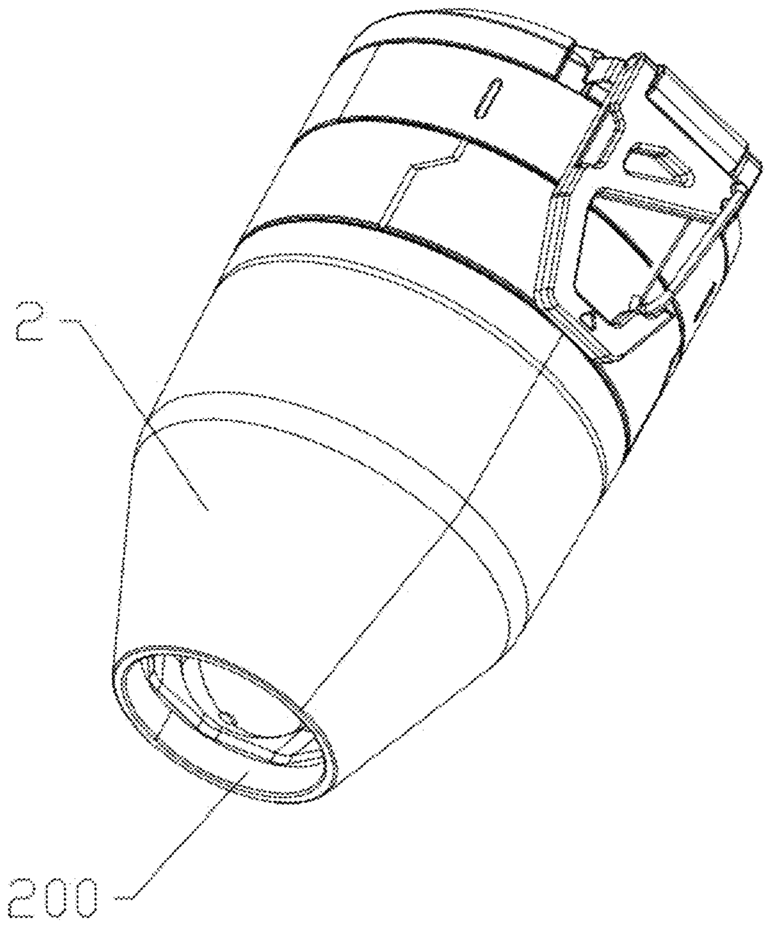
FIG. 2 is a schematic view of the overall structure of one embodiment of the present application.
Figure 3:
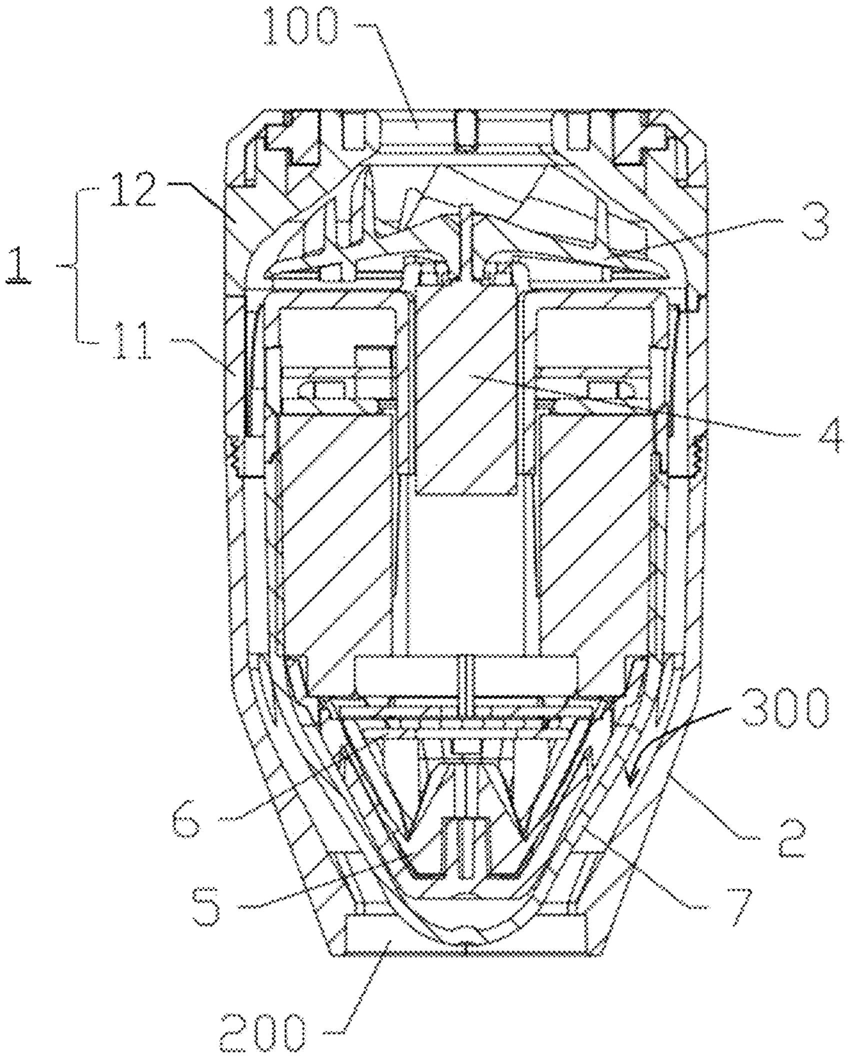
FIG. 3 is a cross-sectional view of one embodiment of the present application.

Referring to FIG. 1 to FIG. 3, one embodiment of the heat dissipation module provided by the present application is described. This heat dissipation module can promptly cool a lighting assembly 567, preventing adverse effects due to continuous temperature rise during operation.

In this embodiment, the heat dissipation module is installed at the lighting assembly 567 and comprises firstly a main housing (1 and 2) covering the periphery of the lighting assembly 567, forming a fluid channel 300 between the lighting assembly 567 and the main housing. Further, the main housing features a medium inlet 100 and a medium outlet 200. The medium inlet 100 is used to input a cooling medium, and the medium outlet 200 is used to output the cooling medium.

And fan blades 3 are connected to a drive component 4 for rotation. The fan blades 3 are used to disperse the cooling medium, causing it to flow through the fluid channel 300 over the surface of the lighting assembly 567 for heat dissipation.

In this embodiment, the fan blades 3 are positioned relatively close to the medium inlet 100. When the cooling medium is input, the continuously rotating fan blades 3 push the cooling medium toward the medium outlet 200, causing it to flow through the fluid channel 300 and cool the lighting assembly 567 as described above.

Notably, in this embodiment, the lighting assembly 567 can be used for illumination or simply as an indicator on a device. However, it is certain that elements tend to heat up when emitting light, so this heat dissipation module addresses the issue of overheating.

And the cooling medium in this embodiment is not limited to a specific form or type. It can be gaseous or liquid, as long as it can flow through the fluid channel 300. If it is liquid, a corresponding liquid outlet can be added to the device.

In another embodiment, the main housing includes a first housing 1 and a second housing 2, which are connected. The medium inlet 100 is provided on the first housing 1, and the medium outlet 200 is provided on the second housing 2.

The fan blades 3 are located inside the first housing 1, and the lighting assembly 567 is positioned near the side of the first housing 1 that is close to the second housing 2. The second housing 2 covers the periphery of the lighting assembly 567 to form the fluid channel 300.

It is understandable that dividing the main housing into a first housing 1 and a second housing 2 facilitates production and assembly of internal parts. Of course, the main housing can also be composed of more sub-housings. In this embodiment, the first housing 1 and the second housing 2 are just one way of implementation. Technicians can adjust the number of sub-housings based on actual needs.

The lighting assembly 567 can be attached to the first housing 1 in various ways, such as by screws, bolts, or clip structures. This aspect is well known in the art and is not the focus of this application, so it is not elaborated further here.

The connection between the first housing 1 and the second housing 2 typically uses a threaded connection, as illustrated. Both the first housing and the second housing 2 are equipped with corresponding threads, allowing them to be screwed together for easy assembly and maintenance. Other connection methods can also be used.

A power supply terminal and a control terminal are usually placed between the second housing 2 and the first housing 1. The power supply terminal powers the fan blades 3 and the lighting assembly 567, while the control terminal handles information processing and output. If these terminals are placed in the first housing 1, they must be positioned in a manner to avoid interference with the rotating fan blades 3.

In one embodiment, referring to FIG. 1 and FIG. 3, the first housing 1 includes a top housing 12 and a middle housing 11. The middle housing 11 connects to the second housing 2, accommodating the lighting assembly 567 and fan blades 3 on opposite sides. The top housing 12 connects to the middle housing 11 on the side of the fan blades 3, providing space for their movement.

The connection between the top housing 12 and the middle housing 11 is typically detachable, like a snap-fit connection. The connection between the middle housing 11 and the lighting assembly, and between the middle housing 11 and the fan blades 3 will be detailed later.

The space between the top housing 12 and the middle housing 11 is configured to fit the fan blades 3. The fan blades 3 in this embodiment have decreasing blade height from the center to the periphery and are convex toward the top housing 12 in an overall profile, increasing airflow area and efficiency. The inner side of the top housing 12 is accordingly curved to match the fan blades 3, further improving airflow and preventing cooling medium stagnation.

Figure 5:
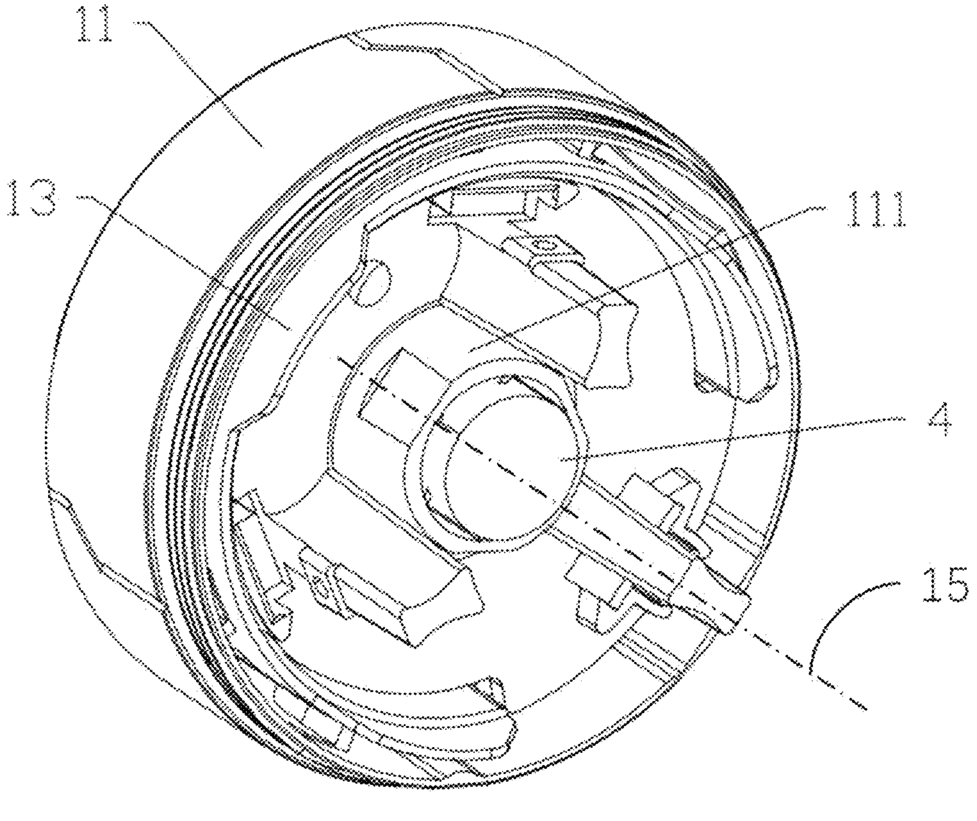
FIG. 5 is a partial structural schematic view of another embodiment of the present application.

Referring to FIG. 5, the middle housing 11 features a through-hole extending into an annular flange 111, at least partially accommodating the drive component 4, whose drive shaft connects to the fan blades 3 along the extension direction of the annular flange 111.

As shown in FIG. 5, the annular flange 111 supports the drive component 4, wherein the drive component 4 is circumferentially limited and isolated by the annular flange 111, reducing vibrations that occurs during the starting of the drive component 4, which could affect surrounding components during operation.

In another embodiment, the middle housing 11 features multiple flow channels 110 circumferentially at its periphery, which are fluidly connected to the fluid channel 300.

Notably, the flow channels 110 ensure an even distribution of the cooling medium. During the rotation of the fan blades 3, the cooling medium is driven by the fan blades 3 through the flow channels 110, and flows by the lighting assembly 567, enabling a heat exchange between the cooling medium and the lighting assembly 567 to achieve an effective cooling.

Configurations like number and width of the flow channels 110 can be adjusted based on the actual dimension of the middle housing 11 and thus not limited here. Alternatively, the direction of the flow channels 110 can either be parallel to or at a preset angle to a central axis 15 of the middle housing 11.

Understandably, in the above configurations, the extension direction of the flow channels 110 may be parallel or not parallel to the central axis 15 of the middle housing 11. The flow direction of the cooling medium may be adjusted through the different configurations, and by changing the preset angle, a targeted heat dissipation can be achieved according to the shape, profile or overheating-prone positions of the lighting assembly 567.

The periphery of the middle housing 11 is divided into a first ring 1101 and a second ring 1102 by the flow channels 110 in a thickness direction. The first ring 1101 docks with the edge of the second housing 2, while the second ring 1102 docks with the edge of the lighting assembly 567.

Figure 4:
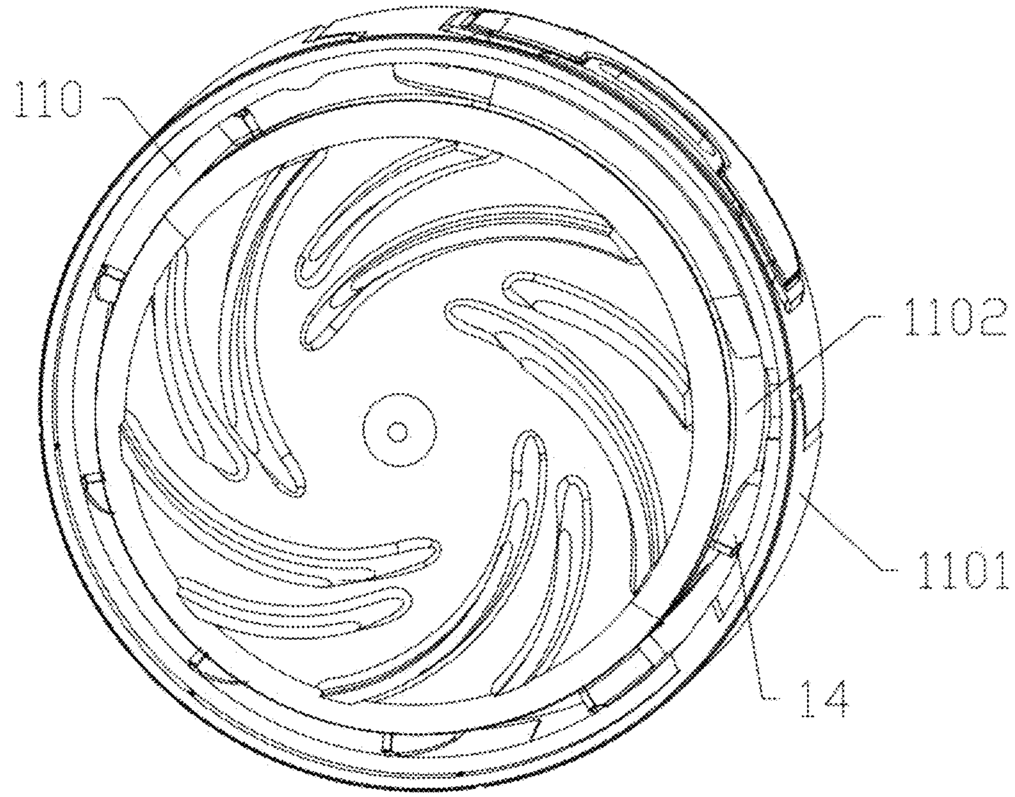
FIG. 4 is a partial structural schematic view of one embodiment of the present application.

Specifically, referring to FIG. 4, the first ring 1101 and the second ring 1102 can be considered as an outer ring and an inner ring of the middle housing 11, respectively. The first ring 1101 and the second ring 1102 of the middle housing 11 are connect by multiple flow guide plates 14. By altering the deflection of the flow guide plates 14, the preset angle mentioned above can be altered, which is perceivable in the figure. And similarly, the size of the flow channels 110 can also be altered by altering the spacing interval of the flow guide plates 14, which is not further detailed here.

The first ring 1101 and the second ring 1102 were docked to the second housing 2 and the lighting assembly 567, respectively. But it can be understood that the docking referred to in this embodiment does not necessarily mean that there is a connection between two counterparts, but may also be butting or abutting relation between two counterparts, as long as the second housing 2 and the lighting assembly 567 can feature a relative connection with the middle housing 11, ensuring that they do not fall apart.

In one embodiment, referring to FIG. 1, the lighting assembly 567 includes a support 5, a lighting board 6, and a first cover 7. The support 5 attaches to the first housing 1, with the lighting board 6 mounted on the support 5 and the first cover 7 enclosing the lighting board 6 and connecting to the first housing 1.

Understandably, the lighting board 6 is provided with lamp beads, electrically connected to the lighting board 6. When provided with electricity, the lamp beads light up for illumination or indication. The first cover 7 protects the lamp beads, typically made transparent or translucent to avoid blocking light.

In this embodiment, the positional relationship between the support 5 and the first cover 7 is not limited. The first cover 7 may cover the periphery of the support 5 or may not wholly cover the support 5. For example, when the support 5 is rod-shaped, the two ends of the rod may be respectively connected to the first housing 1 and the lighting board 6, and the first cover 7 may just cover the lighting board 6. Similarly, according to the different forms of support 5, there may also be other implementations.

Referring to FIG. 1, in this embodiment, the support 5 is hollow and conical, with the lighting board 6 fixed inside it. The first cover 7 encloses both the support 5 and the lighting board 6.

In this embodiment, both the first cover 7 and the support 5 can be transparent or translucent, ensuring proper light emission. And the connection between the lighting board 6 and the support 5 is also shown in the figure, wherein three connecting ends constitute a triangular array, ensuring that the lighting board 6 is centered and stabilized, preventing misalignment. Without affecting the technical effect of this embodiment, the positions of the connection, the number of the connecting ends may be adjusted.

At the same time, the three connecting ends extending from the support 5 are used to connect to the first cover 7 and the middle housing 11. Of course, the corresponding connecting ends on the middle housing 11 can either be integrally formed on the middle housing 11 or be fasteners assembled to it.

In another embodiment, the second ring 1102 and the first cover 7 have corresponding protrusions and recesses for alignment, preventing misalignment or rotation.

For example, as shown in the figures, the second ring 1102 is provided with protruding edges 13, and the first cover 7 is provided with corresponding recesses 71. During the assembly by an operator, the support 5 and the lighting board 6 are first fixed together, followed by docking the support 5 to the middle housing 11, sleeving the first cover 7 onto the support 5, and aligning the connecting ends of the middle housing 11, of the support 5, and of the first cover 7, then fixing with corresponding fasteners.

Without the concave-convex structure, the alignment of the connecting ends is not very efficient, and iterations are needed to achieve an alignment. By providing the concave-convex structure, the operator first aligns the support 5 and other parts with the first cover 7, and then align the protruding edges 13 with the recesses 71 and snap them together, to improve the assembly efficiency.

In another embodiment, the medium outlet 200 on the second housing 2 is configured as a reducing nozzle, decreasing in diameter along the output direction of the cooling medium. The contour of the first cover 7 near the medium outlet 200 is adapted to this reducing nozzle.

Notably, by providing the reducing nozzle, the overall size of the device can be reduced to a certain extent, improving the portability. And by exchanging the second housing 2, the lighting effect can also be modified, such as concentrating the lighting by providing non-transparent portions or achieving aesthetic lighting effects by providing decorative patterns on the second housing 2.

Refer to FIG. 1 and FIG. 2, the present application also provides an LED lighting equipment incorporating one of the heat dissipation modules described above, effectively cooling the lighting assembly 567 of the LED lighting equipment.

It should be noted that the above embodiments can be freely combined as needed. The preferred embodiments of the present application are illustrative and not limiting. Modifications and variations made by those skilled in the art within the principles of the present application are included within the scope of protection.

The invention claimed is:

1. A luminaire comprising:

a lighting assembly;

a main housing surrounding the lighting assembly, the main housing provided with a medium inlet and a medium outlet, and forming a fluid channel between the medium inlet and the medium outlet;

a fan disposed in the main housing and having fan blades positioned proximate the medium inlet, the fan configured to disperse the cooling medium, and to facilitate a flow of the dispersed cooling medium through the fluid channel and over a surface of the lighting assembly for heat dissipation;

the main housing comprises a first housing, and a second housing matched and connected to the first housing, wherein the medium inlet is provided at the first housing, the medium outlet is provided at the second housing, the fan is positioned inside the first housing, the lighting assembly is positioned on a side of the first housing close to the second housing, and the second housing covers the periphery of the lighting assembly to form the fluid channel;

the lighting assembly comprises a support defining a cavity and connected to the first housing, a lighting board provided on the support, lamp beads provided on the lighting board, a first cover connected to the first housing and covering a periphery of the lighting board, and light-transmitting areas formed in both the support and the first cover, wherein the lighting board is fixed within the cavity, the first cover covers both the support and the lighting board, and light emitted by the lamp beads passes through the light-transmitting areas.

2. The luminaire according to claim 1, wherein a portion of the fluid channel proximate the medium outlet is configured as a reducing nozzle, with a diameter of the reducing nozzle decreasing monotonically in an output direction of the cooling medium, and a contour of the first cover near the medium outlet is adapted to a contour of the reducing nozzle.

3. The luminaire according to claim 1, the first housing comprises a top housing, and a middle housing connected to the second housing, and the middle housing is matched and connected to both the lighting assembly and the fan, with the lighting assembly and the fan positioned on opposite sides of the middle housing; and the top housing is connected to the middle housing such that a space is provided between the top housing and the middle housing to allow a motion of the fan blades.

4. The luminaire according to claim 3, the middle housing further comprises a through-hole extending in a direction away from the fan blades to form an annular flange, and at least part of the fan passes through the annular flange, and a drive shaft of the fan is connected to the fan blades along an extension direction of the annular flange.

5. The luminaire according to claim 3, the middle housing comprises a plurality of flow channels provided circumferentially at a periphery of the middle housing and connected to the fluid channel;

the middle housing having a first ring docking with an edge of the second housing, and a second ring docking with an edge of the lighting assembly, the flow channel passing between the first and second rings.

6. The luminaire according to claim 5, further comprising corresponding concave-convex structures provided in the second ring and the edge of the lighting assembly for guiding an alignment between the middle housing and the lighting assembly and preventing misalignment or rotational deviation; and each flow channel extends parallel to an axial direction of the middle housing or at a preset angle to the axial direction of the middle housing.

7. The luminaire according to claim 5, further comprising a plurality of guide plates connecting the first ring and the second ring.

8. The luminaire according to claim 7, wherein each flow channel extends at a preset angle to an axial direction of the middle housing, and a deflection of the flow guide plates determines the preset angle.

9. The luminaire according to claim 7, wherein each flow channel extends parallel to an axial direction of the middle housing.

10. The luminaire according to claim 1, the lighting assembly further comprising an LED lighting module.

11. The luminaire according to claim 10, wherein the main housing comprises a first housing, and a second housing matched and connected to the first housing;

wherein the medium inlet is provided at the first housing, the medium outlet is provided at the second housing; and the fan is positioned inside the first housing, the lighting assembly is positioned on a side of the first housing close to the second housing, and the second housing covers the periphery of the lighting assembly to form the fluid channel.

12. The luminaire according to claim 11, wherein the first housing comprises a top housing, and a middle housing connected to the second housing, and the middle housing is matched and connected to both the lighting assembly and the fan, with the lighting assembly and the fan positioned on opposite sides of the middle housing; and the top housing is connected to the middle housing such that a space is provided between the top housing and the middle housing to allow a motion of the fan blades.

13. The luminaire according to claim 12, wherein the middle housing comprises a plurality of flow channels provided circumferentially at a periphery of the middle housing and connected to the fluid channel; and the middle housing having a first ring docking with an edge of the second housing, and a second ring docking with an edge of the lighting assembly, the flow channel passing between the first and second rings.

14. The luminaire according to claim 13, further comprising a plurality of guide plates connecting the first ring and the second ring, wherein each flow channel extends at a preset angle to an axial direction of the middle housing, and a deflection of the flow guide plates determines the preset angle.

* * * * *